(12) United States Patent
Kassab (10) Patent No.: US 8,114,495 B1
(45) Date of Patent: Feb. 14, 2012

(54) VEHICLE STICKER FILM INTERMEDIARY

(75) Inventor: Peter K. Kassab, Chicago, IL (US)

(73) Assignee: Lemeer Design, L.L.C., Chicago, IL (US)

( * ) Notice: Subject to any disclaimer, the term of this patent is extended or adjusted under 35 U.S.C. 154(b) by 777 days.

(21) Appl. No.: 12/135,870

(22) Filed: Jun. 9, 2008

Related U.S. Application Data (60) Provisional application No. 60/942,768, filed on Jun. 8, 2007.

(51) Int. Cl.
*B32B 9/00* (2006.01)
*B32B 33/00* (2006.01)
*B32B 7/12* (2006.01)
*G09F 7/12* (2006.01)

(52) U.S. Cl. .............. 428/40.1; 428/41.9; 428/42.1; 428/354; 40/593; 40/594; 40/615

(58) Field of Classification Search ........... 428/40.1–43; 40/593, 594, 615
See application file for complete search history.

(56) References Cited

U.S. PATENT DOCUMENTS

| | | |
|---|---|---|
| 3,533,178 A | 10/1970 | Strohmaier |
| 3,967,022 A | 6/1976 | Hasei |
| 4,184,276 A | 1/1980 | Hernandez |
| 4,225,369 A | 9/1980 | Felchlin |
| 4,528,232 A | 7/1985 | Cliffe |
| 4,536,423 A | 8/1985 | Travis |
| H046 H | 4/1986 | Gladden |
| 4,670,490 A | 6/1987 | Yoshida et al. |
| 4,935,288 A | 6/1990 | Honaker et al. |
| 4,992,121 A | 2/1991 | Rubino |
| 5,102,171 A | 4/1992 | Saetre |
| 5,207,011 A | 5/1993 | Coulthard |
| 5,258,214 A | 11/1993 | Cooledge et al. |
| 5,290,067 A | 3/1994 | Langen |
| 5,334,431 A | 8/1994 | Longtin |
| 5,403,025 A | 4/1995 | Shanley |
| 5,464,681 A | 11/1995 | Luce |
| 5,502,912 A | 4/1996 | LeBoff et al. |
| 5,609,938 A | 3/1997 | Shields |
| 5,622,389 A | 4/1997 | Courtney |
| 6,258,200 B1 | 7/2001 | Kassab |
| 7,422,648 B1 | 9/2008 | Kassab |
| 7,592,057 B2 * | 9/2009 | Dronzek et al. ............. 428/40.1 |
| 2002/0142155 A1 | 10/2002 | Steinberg |

FOREIGN PATENT DOCUMENTS

DE 29720696 U1 8/1998

(Continued)

*Primary Examiner* — Patricia Nordmeyer
(74) *Attorney, Agent, or Firm* — Banner & Witcoff, Ltd.

(57) ABSTRACT

A sticker assembly includes an indicia-bearing sticker (30) having an adhesive layer (34). A polyester film (20) is provided having a first side (22) and a second side (24), the second side (24) having a low-tack adhesive (25) thereon. The first side (22) of the polyester film (20) is adhered to the adhesive layer (34) of the sticker (30). The second side (24) of the polyester film (20) is applied to a receiving surface (12) and held against the surface (12) by the low-tack adhesive (25) wherein the polyester film (20) and the sticker (30) are releasably adhered to the receiving surface (12) and wherein the indicia-bearing sticker (30) is displayed for viewing. In one embodiment, the sticker (30) is a vehicle windshield sticker (30) and the receiving surface (12) is a vehicle windshield.

14 Claims, 5 Drawing Sheets

FOREIGN PATENT DOCUMENTS

| | | |
|---|---|---|
| FR | 2364518 A1 | 7/1978 |
| GB | 698584 | 10/1953 |
| GB | 730524 | 5/1955 |
| GB | 2174233 A | 10/1986 |
| GB | 2217256 A | 10/1989 |
| GB | 2231551 A | 11/1990 |
| JP | 59111183 A | 6/1984 |
| JP | 997014 A | 4/1997 |

* cited by examiner

VEHICLE STICKER FILM INTERMEDIARY

CROSS-REFERENCE TO RELATED APPLICATIONS

The present application is a continuation-in-part of and claims priority to and the benefit of U.S. Provisional Application No. 60/942,768, filed on Jun. 8, 2007, which application is incorporated by reference and made a part hereof.

TECHNICAL FIELD

This invention relates generally to a film utilized as an intermediary and more particularly to a polyester film having a low-tack adhesive layer used as an intermediate layer between a car windshield and a car windshield sticker.

BACKGROUND OF THE INVENTION

There are many applications where indicia-bearing stickers are placed on receiving surfaces for display. The stickers include a strong adhesive wherein the sticker is, more or less, permanently bonded to the receiving surface.

For example, vehicle window stickers are often required to be applied to car windows such as a car windshield. These vehicle window stickers can include park registration stickers, parking lot stickers and vehicle registration stickers. Other types of vehicle window stickers include stickers displaying emissions data and insurance data, stickers displaying support for police and stickers displaying affiliation with a school, sport team or charity.

These vehicle windshield stickers have indicia-bearing print thereon and a layer of adhesive over the indicia. The stickers are adhered to the inside of the vehicle windshield so they can be viewed from the outside of the vehicle through the glass or plastic windshield. The adhesive typically used on windshield stickers forms a strong bond with the window glass. Consequently, once the sticker is adhered to the windshield, it is extremely difficult to remove the sticker.

In certain instances, it is desirable to remove the sticker from the windshield. For example, park registration stickers and vehicle registration stickers normally expire annually, and a new sticker must be purchased and applied to the windshield. Many car owners prefer to remove the expired vehicle registration before replacing it with the current year's vehicle registration to prevent blind spots created by leaving old stickers on the windshield. The strong adhesive used on the vehicle registrations makes it almost impossible to remove the sticker without either mutilating or destroying the sticker. Consequently, simply trying to peel the sticker off of the windshield breaks the sticker into small pieces. One may use a razor blade to shave the sticker from the windshield. However, this usually causes a bending or possible breaking of the razor blade causing possible injury to one's fingers. In addition, the razor blade frays the sticker into small shavings that fall onto the dashboard, into the air vent and onto car floor making for difficult clean-up. Furthermore, if the sticker is placed at a lowermost position on the windshield, access by one's fingers to the sticker is limited because of the angle between the windshield and dashboard.

Invariably, even when using a razor blade, some of the sticker adhesive remains on the windshield. One must then use a solvent to clean the remaining adhesive from the windshield.

In certain instances, it is desirable to remove a windshield sticker from one vehicle and transfer it to another vehicle. For example, one who owns multiple cars may transfer an affiliation or parking garage sticker from one car to another car. Windshield stickers may also need to be transferred when a car is sold. The strong adhesive used on the stickers makes this removal almost impossible without mutilating or destroying the stickers.

In all, the process of removing vehicle registrations and other vehicle windshield stickers from windshields is sloppy, very time consuming and frustrating to vehicle owners.

Like vehicle windshield stickers, trying to remove conventional stickers adhered directly onto a receiving surface is also frustrating. When trying to peel the sticker from the surface, the sticker often tears into small pieces. In addition, adhesive residue often remains on the receiving surface requiring additional cleaning.

Also, the general effects of temperature, sunlight, and humidity have been found to affect the film intermediary and the sticker assembly. An increase in average global temperatures can also have an affect. It is difficult to easily predict the effects of such conditions without focused testing. With average summer temperatures reaching historic peak levels, for example, prior film intermediaries could approach the limit of their stability. A break down of film stability can lead to the film overheating, which can cause the windshield sticker to potentially shrink, wrinkle, or curl. This change in stability combined with the heated up adhesive can cause the windshield sticker to peel off the film, or cause the entire sticker assembly to fall off the windshield. Peripheral edges of the sticker assembly including at the corners thereof can also begin to curl and peel away from the windshield over time, which is undesirable. Considerable testing in heat, sunlight, and humidity simulation chamber tests have been conducted to determine a film intermediary having enhanced performance over previous film intermediaries.

Thus, while certain film intermediaries according to the prior art provide a number of advantageous features, they nevertheless have certain limitations. The present invention seeks to overcome certain of these limitations and other drawbacks of the prior art, and to provide new features not heretofore available.

SUMMARY OF THE INVENTION

The present invention utilizes a film as an intermediary between a sticker having an adhesive layer, such as a car windshield sticker, and a receiving surface, such as a car windshield.

According to a first aspect of the invention, a sticker assembly is disclosed. A sticker has an indicia-bearing surface. A non-perforated layer of polyester film having a first side and a second side, with the second side having a low-tack adhesive layer is provided. An adhesive is disposed between the sticker and the film and connects the sticker to the polyester film. The sticker assembly is adapted to be releasably adhered to a receiving surface via the low-tack adhesive layer and the indicia-bearing surface is viewable through the receiving surface.

According to another aspect of the invention, a method of releasably adhering an indicia-bearing windshield sticker to a receiving surface is disclosed. A non-perforated layer of polyester film having a first side and a second side, the second side having a low-tack adhesive thereon is provided. The windshield sticker is adhered to the first side of the polyester film with a layer of adhesive to form a sticker assembly. The adhesive layer can be integral with the windshield sticker as in the form of sticker or applied separately. The sticker assembly is then adhered to the receiving surface by placing the second side of the polyester film against the receiving surface wherein the indicia on the windshield is displayed for viewing.

According to another aspect of the invention, a sticker assembly for a vehicle having a windshield is disclosed. An indicia-bearing car windshield sticker has an indicia-bearing substrate with an adhesive layer disposed on the substrate. The adhesive layer comprises a first strip of adhesive positioned along a peripheral edge of the sticker and a second strip of adhesive positioned along an opposite peripheral edge of the sticker. A first non-perforated strip of polyester film having a first side and a second side with the second side of the first strip has a low-tack adhesive thereon. A second non-perforated strip of polyester film has a first side and a second side with the second side of the second strip having a low-tack adhesive thereon. The second sides of the strips of polyester are capable of being releasably adhereable to the windshield so that the indicia-bearing substrate is viewable through the windshield from outside of the vehicle.

According to another aspect of the invention, a method of releasably adhering a vehicle windshield sticker to a vehicle windshield is disclosed. First an indicia-bearing windshield sticker comprising a first strip of adhesive positioned over the peripheral edge and a second strip of adhesive positioned along an opposite peripheral edge of the sticker is provided. Second, a first non-perforated strip of polyester film having a first side and a second side with the second side having a low-tack adhesive thereon is provided. A second non-perforated strip of polyester film having a first side and a second side, the second side of the second strip of film having a low-tack adhesive thereon is provided. Next, the first side of the first strip of film is positioned to correspond to the first strip of the adhesive to adhere to the first side of the first strip of film directly to the first strip of the adhesive. The first side of the second strip of film is positioned to correspond to the second strip of the adhesive to adhere to the first side of the second strip of film directly to the second strip of the adhesive. The sticker, the first and second strips of adhesive and the first and second strips of polyester film define a sticker assembly. The sticker assembly is then releasably adhered to the windshield by placing the second sides of the strips of polyester film against the windshield so that the low-tack adhesive is positioned against the windshield so that the indicia is viewable through the windshield and the sticker can be peeled off the windshield without damage to the sticker.

According to another aspect of the invention, the film intermediary is a polyester film.

According to a further aspect of the invention, the polyester film is trimmed wherein its peripheral edges are in registry with peripheral edges of the windshield sticker.

According to a further aspect of the invention, additional films are employed as an intermediary with the vehicle sticker. The additional films may comprise vinyl films, polyvinylchloride films, polyethylene films, and polycarbonate films.

Other features and advantages of the invention will be apparent from the following specification taken in conjunction with the following drawings.

BRIEF DESCRIPTION OF THE DRAWINGS

FIG. 11 is a perspective view of another embodiment of the invention showing a sticker having an adhesive layer being adhered to a film to form a sticker assembly;

FIG. 12 is a front elevational view showing the sticker assembly of FIG. 11, with the other protective paper layer removed, adhered to a household appliance;

FIG. 13 is a partial cross-sectional view, taken along Lines 13-13 in FIG. 12, of the assembly adhered to the household appliance;

DETAILED DESCRIPTION

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
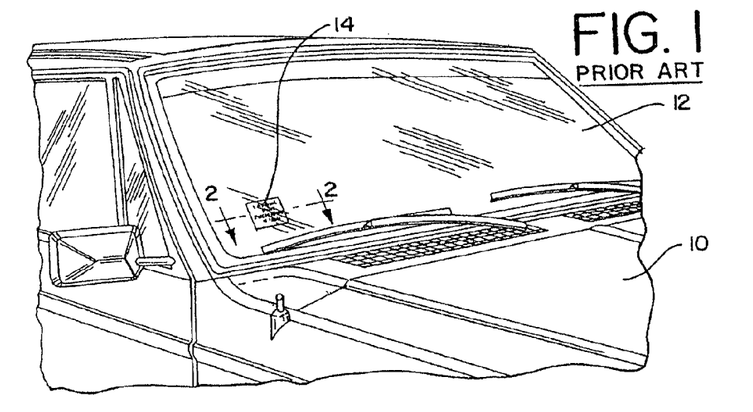
FIG. 1 is a partial perspective view of a vehicle having a conventional windshield sticker adhered to its windshield.

Referring to the drawings, FIG. 1 shows a partial view of a vehicle 10, having a windshield 12. Although a car is shown in FIG. 1, the present invention applies to any number of vehicles having windshields and windows. The car 10 has a conventional car windshield sticker 14 adhered to an inside surface 13 (FIG. 2) of the windshield 12. The car windshield sticker 14 in FIG. 1 could be a park registration sticker or vehicle registration sticker. The present invention, nevertheless, applies to any type of car window sticker that is designed to be adhered to the car windshield 12 or other car windows by an adhesive layer on the sticker 14. It will be understood that the term "windshield" encompasses any car window or other receiving surface.

Figure 2:
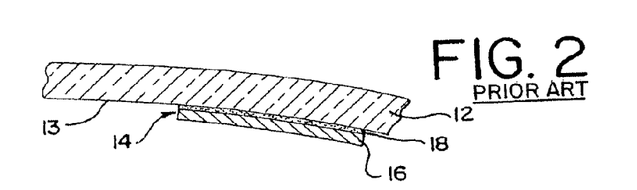
FIG. 2 is a partial cross-sectional view, taken along Lines 2-2 of FIG. 1.

FIG. 2 shows a partial cross-sectional view of the conventional windshield sticker 14. The sticker 14 includes an indicia-bearing substrate 16 and an adhesive layer 18. The indicia that the substrate 16 bears is typically registration information such as a park name and identification number or other relevant information. The indicia on the substrate 16 is designed to be viewed from outside of the car 10 through the windshield 12. The adhesive layer 18 is transparent and is applied over the substrate 16. The sticker 14 also includes a protective paper layer (not shown) over the adhesive layer 18. The paper layer is designed to be peeled off and the adhesive layer 18 is placed in direct contact with an inside surface 13 of the windshield 12 to mount the sticker 14. It is understood that the adhesive layer 18 is a permanent adhesive layer 18 having very strong bonding properties.

Figure 3:
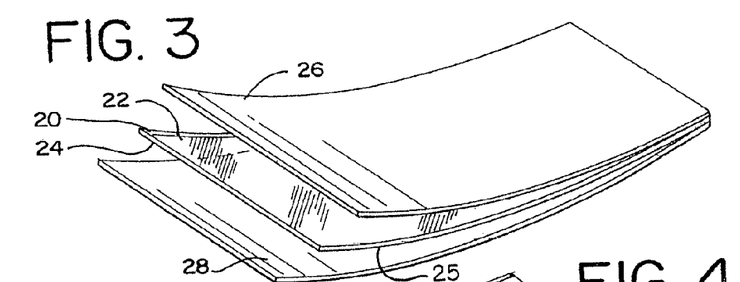
FIG. 3 is a perspective view of a film having layers of protective paper on each side of the film.

In the present invention, a layer of film is used as an intermediary between the windshield sticker 14 and the windshield 12. In one exemplary embodiment, the film may be a polyester film. As explained in greater detail below, through extensive testing, the inventor has found that the polyester film disclosed herein provides enhanced operational features as an intermediary for vehicle windshield stickers and other stickers. FIG. 3 shows a polyester film 20 that is transparent. It is important for the film 20 to be transparent for the indicia on the sticker to be seen through the film 20 and the windshield 12. In this embodiment, and as shown in FIG. 3, a polyester film 20 is provided that is generally a clear polyester film. The polyester film 20 is generally stiffer having more rigidity than other film materials used in the prior art. The film 20 can include a broad range of films having these properties as will be further discussed below. The polyester film 20, with its protective layers 26, 28 (FIG. 3) and a car windshield sticker 30 (FIG. 5) are first provided. As further shown in FIG. 3, the polyester film 20 has a first side 22 and a second side 24. The second side 24 has a low-tack adhesive layer 25 thereon. The low-tack adhesive layer 25 is generally a removable pressure sensitive acrylic adhesive. The low-tack adhesive layer 25 is generally affixed to the polyester film 20 and is formulated such that the adhesive possesses adhesion properties such that it can be releasably adhered to a receiving surface without adhesive transfer. The low-tack adhesive does not lock-up or become permanently affixed to the receiving surface (like a high-tack adhesive such as adhesive layer 18) and/or does not leave a residue on the receiving surface. Thus, the low-tack adhesive layer 25 remains with the polyester film 20 when the film is peeled from a receiving surface as described below. The low-tack adhesive can include any number of adhesives having these properties. The polyester film 20 has a protective paper layer 28 or liner 28 adjacent the second side 24 of the polyester film 20. The film could also be provided with a protective paper layer for the first side 22 of the film such as protective layer 26. It is understood, however, that the protective layer 26 could be omitted in one exemplary embodiment (e.g., FIG. 4).

Figure 4:
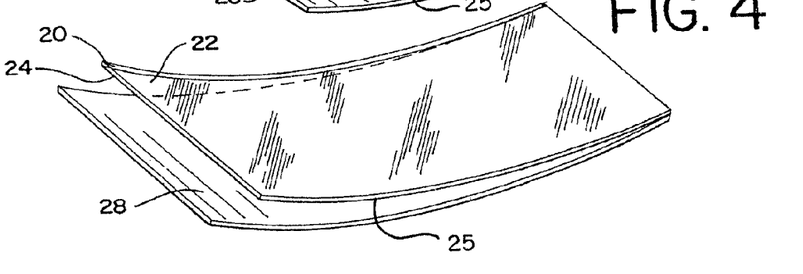
FIG. 4 is a perspective view showing the film of FIG. 3 having one of the protective paper layers removed.
Figure 5:
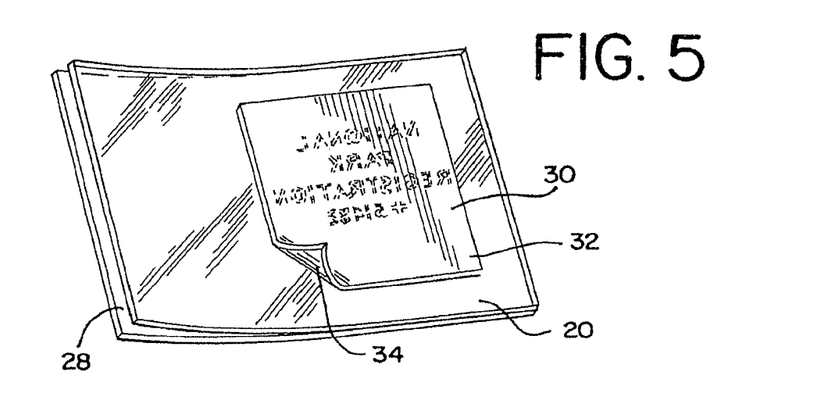
FIG. 5 is a perspective view showing the film of FIG. 4 with a windshield sticker having an adhesive layer being adhered to the film to form a sticker assembly.
Figure 6:
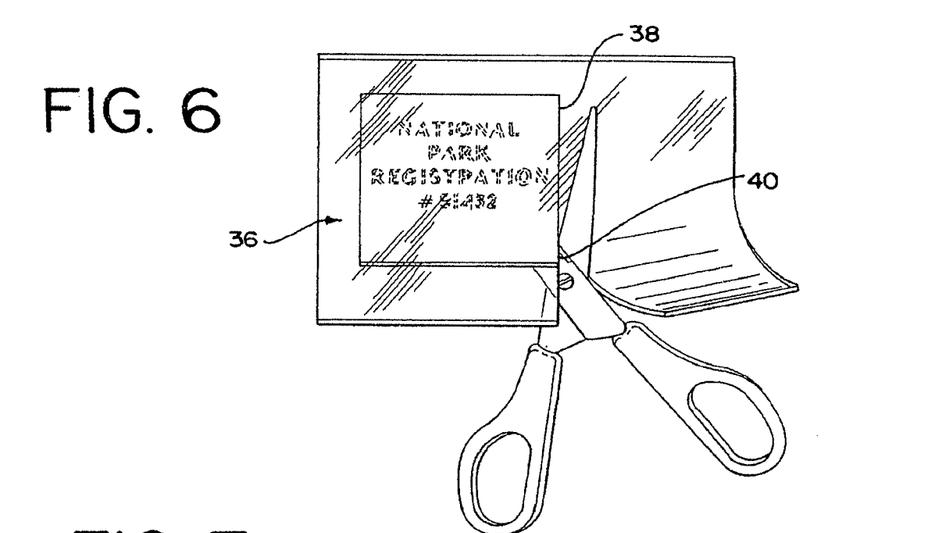
FIG. 6 is a plan view showing the trimming of the sticker assembly wherein its peripheral edges are in registry with peripheral edges of the windshield sticker.
Figure 7:
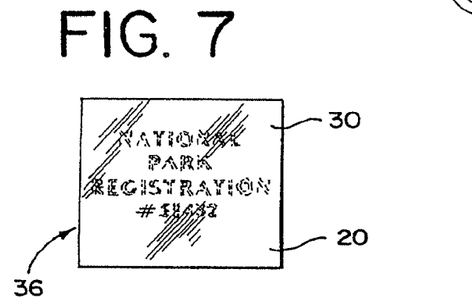
FIG. 7 is a front elevational view of the sticker assembly.

FIGS. 3-8 illustrate the method of the present invention for releasably adhering an indicia-bearing substrate to a receiving surface, such as a car windshield. The polyester film 20 with its protective paper layers 26, 28 (FIG. 3) and a sticker such as a car windshield sticker 30 (FIG. 5) are first provided. As shown in FIGS. 5-7, the windshield sticker 30 may bear indicia such as park registration information. As discussed, the sticker 30 could be any number of different stickers designed to be adhered to a car window by an adhesive layer. As shown in FIG. 5, the sticker 30 has an indicia-bearing substrate 32 with an adhesive layer 34 applied over the substrate 32. In this type of sticker, the adhesive is applied over the indicia. In addition, the adhesive layer 34 associated with the sticker 30 is a high-tack adhesive, or permanent adhesive, that is designed to permanently affix the sticker 30 to a receiving surface. With a high-tack adhesive, the sticker 30 cannot be peeled from the receiving surface without damage to the sticker 30 and/or without leaving an adhesive residue.

Figure 10:
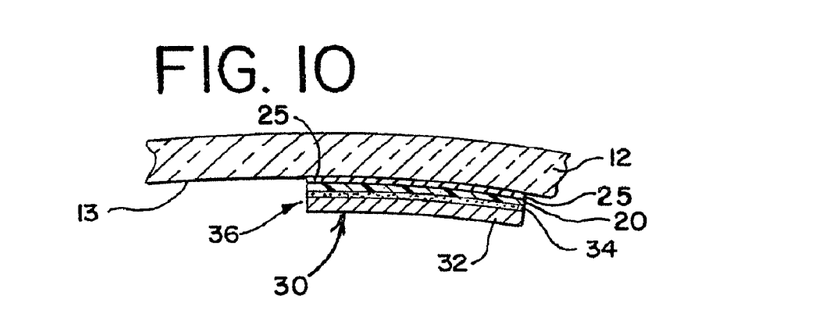
FIG. 10 is a partial cross-sectional view, taken along Lines 10-10 of FIG. 9, showing the sticker assembly adhered to the windshield.

As shown in FIG. 4, the first protective paper layer 26 is removed to expose the first side 22 of the polyester film 20. A protective paper layer (not shown) provided with the windshield sticker 30 is also removed to expose the high-tack adhesive layer 34. The polyester film 20 may be a continuous, uninterrupted layer and is unperforated having no holes. Holes or perforations are undesirable because it would allow the adhesive to contact the windshield. With reference to FIGS. 5 and 10, the sticker 30 is adhered to the first side 22 of the polyester film 20. This fixedly attaches the sticker 30 or substrate to the film 20. While a releasing agent could be used with the film 20 of the present invention, the film 20 used does not utilize a releasing agent that would allow the film 20 to be separated from the sticker 30, because doing so will increase the likelihood of the sticker 30 becoming separated or falling off from the film 20 during normal use due to environmental factors. Once the sticker is adhered, it remains adhered. Attempts could be made to separate the film and sticker but it would be undesirable to do so. Furthermore, attempts to separate would likely damage the film and the sticker. It is understood that the adhesive used in typical windshield stickers is a high-tack adhesive and thus is very strong and when used with a film without a suitable releasing agent, the sticker and film cannot be separated once adhered to one another. Obviously, one could attempt to apply a solvent or scrape the film off but this would likely damage the film and sticker. Thus, if one wanted to apply a new sticker to the windshield, one would simply form a new assembly. As shown in FIGS. 6, 7 and 10, once adhered, a polyester sticker assembly 36 is formed and comprises the polyester film 20 and the windshield sticker 30. The sticker assembly 36 is a layered structure. It is understood, for example in FIG. 6, the protective layer 28 could remain with the sticker 30 and film 20 until the user is ready to place the assembly on a windshield or receiving surface.

Figure 6A:
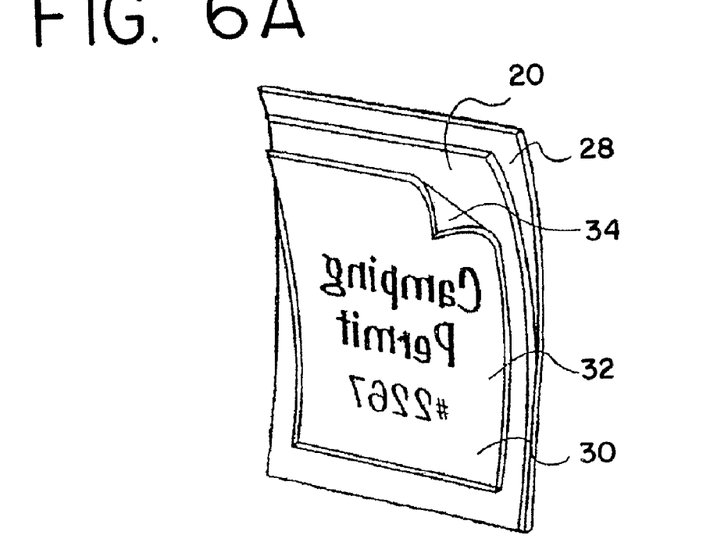
FIG. 6A is a perspective view of another embodiment of the invention showing the film with a protective layer and with a windshield sticker having an adhesive layer being adhered to the film to form a sticker assembly.
Figure 6B:
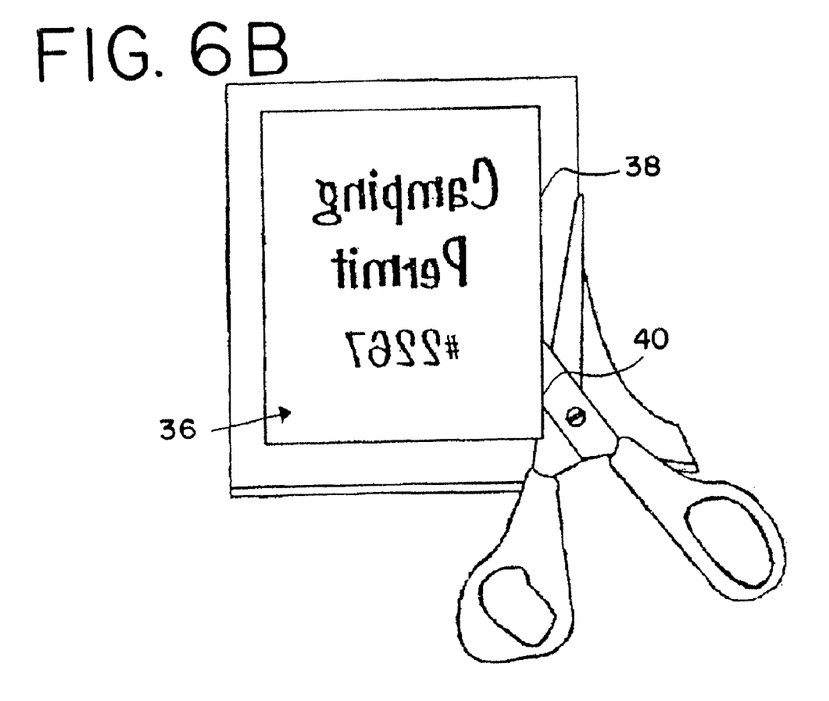
FIG. 6B is a plan view showing the trimming of the sticker assembly of FIG. 6a wherein its peripheral edges are in registry with peripheral edges of the windshield sticker.

As shown in FIG. 6, the polyester film 20 may have a larger surface area than the windshield sticker 30. Such configuration is often the case. The portions of the polyester film 20 that extend beyond the windshield sticker 30 are trimmed to conform to the size of the windshield sticker 30. Peripheral edges 38 of the sticker 30 are trimmed edges and are then in registry with peripheral edges 40 of the film 20 (FIGS. 6 and 7). For clarity, FIGS. 6 and 7 are shown with the second protective layer 28 removed. To prevent soiling of the second side 24 of the polyester film 20 with the low-tack adhesive layer 25, however, the second protective paper layer 28 is preferably retained on the film 100 while the film 20 is trimmed. Thus, it is readily understood, however, that the protective layer 28 can remain on the film 20 wherein the film 20 and protective layer 28 are trimmed together (See e.g., FIGS. 6A and 6B). The second protective paper layer 28 is not removed until the sticker assembly 36 is ready to be adhered to a receiving surface. This helps to prevent dirt or other particles from contaminating the second side 24 of the film 20 having the low-tack adhesive. The protective layer 28 also provides further rigidity to the assembly allowing for easier trimming and handling by the user. Because the film 20 is transparent, it will be virtually undetected when the sticker assembly 36 is adhered to the car windshield 12. As shown in FIG. 7, the second protective paper layer 28 is then removed to expose the second side 24 of the polyester film 20. The indicia-bearing sticker 30 is seen through the transparent polyester film 20. It is further understood that the protective layers 26,28 could have a slit line thereon to aid a user in peeling the protective layer 26,28 from the film 20. Such slitting, however, may leave a line or indentation on the film 20 which can affect the overall clarity of the film. Thus, in an exemplary embodiment, the protective layers 26,28 do not include a slit line.

Figure 8:
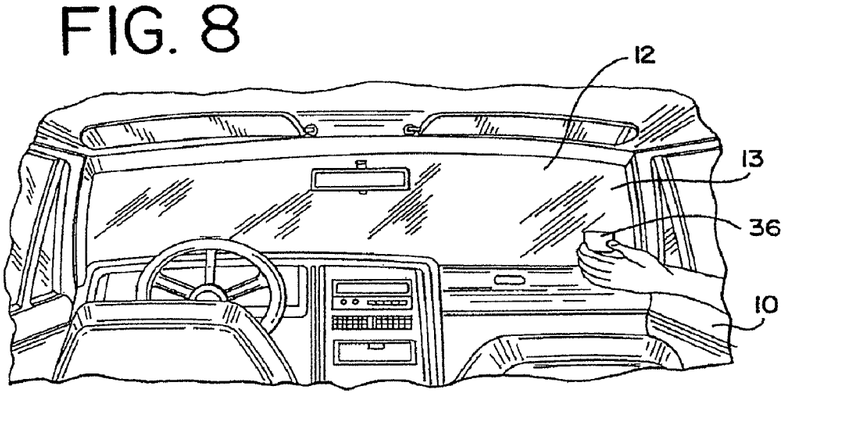
FIG. 8 is a partial perspective view showing the sticker assembly being adhered to the inside of a vehicle windshield.
Figure 9:
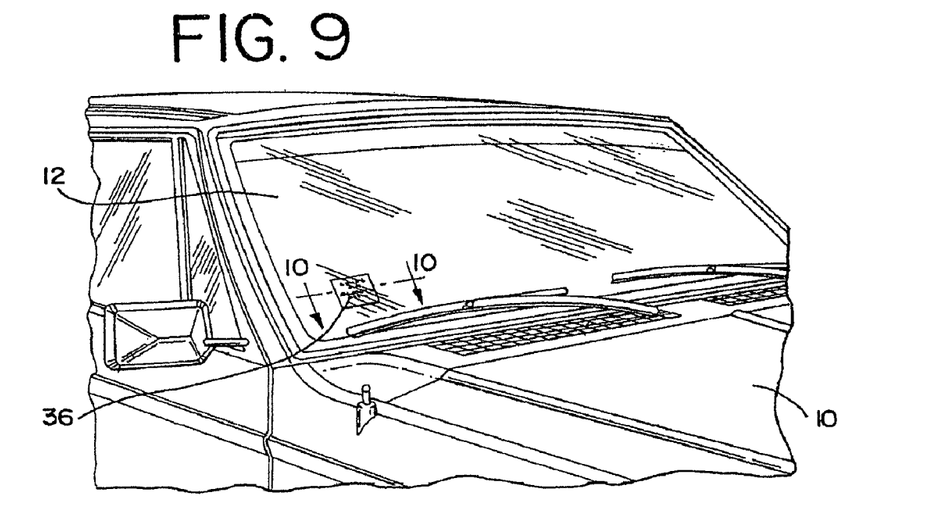
FIG. 9 is a partial perspective view showing the sticker assembly adhered to the windshield as viewed from outside of the vehicle.

As shown in FIG. 8, the sticker assembly 36 is then adhered to a receiving surface such as the car windshield 12. Specifically, the second surface 24 of the film 20 is placed against the inside surface 13 of the windshield 12. Thus, the low-tack adhesive layer 25 is placed against the inside surface 13 of the windshield 12 to releasably adhere the sticker assembly 36 to the windshield 12. As shown in FIG. 9, the indicia-bearing sticker 30 is readily seen through the windshield 12 from outside of the vehicle 10. As previously stated, the transparency of the film 20 makes it virtually undetectable. With such configuration, the car windshield sticker 30 is releasably adhered to the car windshield 12 without the high-tack adhesive layer 34 coming into direct contact with the windshield 12. The properties of the low-tack adhesive 25 do not provide a permanent bond between the sticker assembly 20 and the windshield 12. The sticker 30 can then be easily removed when desired and re-adhered to the windshield 12 if desired. Even if removed, the low-tack adhesive 25 remains with polyester film 20 and does not transfer to the windshield 12. Thus, the windshield 12 also remains clean from adhesive residue associated with the sticker 30.

FIG. 10 shows a partial cross sectional view of the polyester sticker assembly 36 releasably adhered to the windshield 12. The sticker assembly 36 is a layered structure that comprises the sticker 30 and the polyester film 20. The windshield sticker 30 includes the indicia-bearing substrate 32 and the adhesive layer 34. The adhesive layer 34 adheres the sticker 30 to the first side 22 of the polyester film 20 in permanent fashion. The polyester film 20 is releasably adhered to the inside surface 13 of the windshield 12. The indicia-bearing substrate can thus be viewed through the windshield 12 as the polyester film 20, adhesive layer 34 and the low-tack adhesive layer 25 are transparent.

Figures 11, 12, 13, 15:
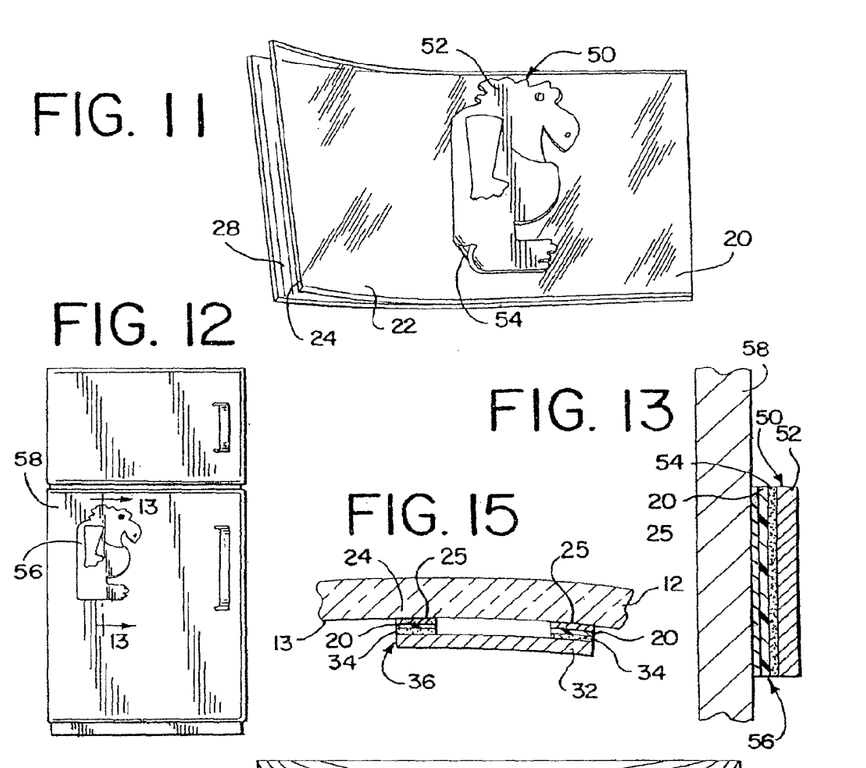

FIGS. 11-14 illustrate another embodiment of a method and assembly for releasably adhering an indicia-bearing substrate to a receiving surface. The film 20 shown in FIG. 3 is also used in this embodiment. The substrate is a conventional sticker 50 having an indicia-bearing surface 52 and an adhesive layer 54. While in the windshield sticker 30, the adhesive layer 34 is applied over the indicia-bearing surface 32, the sticker 50 has the indicia-bearing surface 52 on one side and the adhesive layer 54 on an opposite side of the sticker 50. The sticker 50 shown in FIG. 11 is one marketed towards children, for example, although any type of conventional sticker could be used.

As shown in FIG. 11, the film 20 is provided and has the first protective paper layer 26 removed. The protective paper layer covering the adhesive layer 54 on the sticker 50 (not shown) is also removed. The sticker 50 is then adhered to the first side 22 of the film via the adhesive layer 54. While the adhesive layer 54 is integral with the sticker 50, it is understood that one could apply the adhesive layer 54 as a separate step. A sticker assembly 56 is thus formed from the sticker 50 and the film 20. If desired, the film could be trimmed to place the peripheral edges of the film 20 in register with the peripheral edges of the sticker 50 (FIG. 12).

The sticker assembly 56 is now ready to be releasably adhered to a receiving surface. FIG. 12 shows a receiving surface 58 in the form of a household refrigerator. The sticker assembly 56 is then releasably adhered to the household refrigerator 58 by placing the second side 24 of the film 20 with the low-tack adhesive layer 25 against the refrigerator 58. The low-tack adhesive layer 25 on the second side 24 holds the sticker assembly 56 to the refrigerator. FIG. 13 shows a cross-section of the sticker assembly 56 adhered to the refrigerator 58 showing the film 20 acting as an intermediary.

Figure 14:
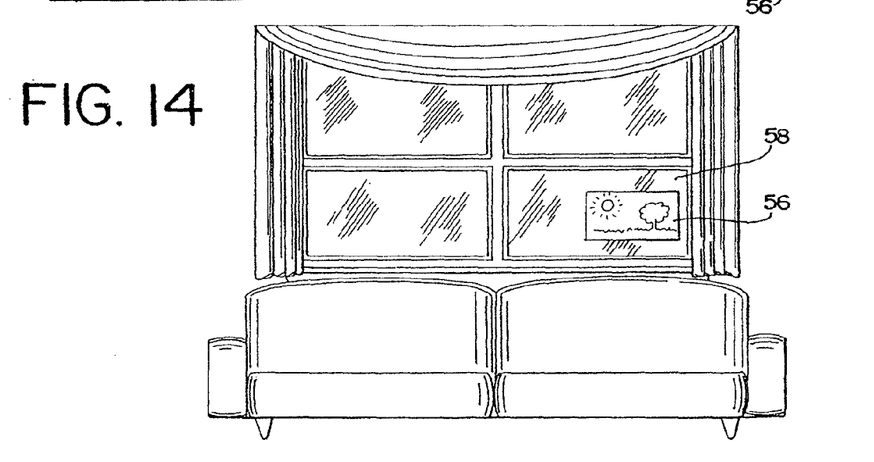
FIG. 14 is a front elevational view showing a sticker assembly adhered to a household window; and, FIG. 15 is partial cross-sectional view of another embodiment of a sticker assembly of the present invention.

With the intermediary 20, children can place stickers on home appliances, for example, without damaging the surfaces of the appliances. The stickers can be easily removed by peeling off the film 20 from the surface 58 and reapplied to any receiving surface. Besides the home appliances, many other receiving surfaces 58 are possible. FIG. 14 shows a intermediary used between a decorative picture and a household window. It is also contemplated that indicia can be applied directly to the first side 22 of the film 20 and the film releasably adhered to a receiving surface 58. For example, an individual consumer could paint or apply other artwork or designs directly to the first side 22 of the film 20 and the film adhered to a receiving surface 58. Thus, the landscape picture shown in FIG. 14 could be painted directly onto the transparent film 20. One could see through the film and window 58 except for the areas of the painted landscape.

Another embodiment of the present invention is designed for use with "temporary stickers" made from paper (FIG. 15). The adhesive layer on these temporary stickers typically comprises a thin line of adhesive along the sides of the sticker rather than a complete adhesive layer across the entire face of the sticker. The indicia-bearing portion of the sticker does not have adhesive over that portion. The sticker may have a line of adhesive on one vertical side of the sticker and another line of adhesive on an opposed vertical side of the sticker. The present invention can also be used with such temporary stickers. Rather than a single piece of film 20 that covers the entire sticker, the film 20 now comprises two strips of film that correspond to the lines of adhesive on the sticker. The strips of film are positioned to correspond to the position of the adhesive strips. The strips can also be trimmed to correspond in size to the strips of adhesive. Thus, the strips of polyester film 20 can have trimmed edges that correspond in size to the lines of adhesive on the sticker. After the strips of film 20 are adhered to the lines of adhesive, the temporary sticker is releasably adhered to the windshield 12 as shown in FIGS. 8-10. This type of sticker assembly is shown in FIG. 15 wherein the second sides of the strips of film 20 are releasably adhered to the windshield 12.

The polyester film 20 of the present invention provides several advantages. The polyester film 20 and low-tack adhesive 25 are generally transparent making them virtually undetectable. Using the polyester film 20 allows the window sticker 30 to be releasably adhered to the car windshield 12 without the high-tack adhesive layer 34 coming into direct contact with the windshield 12. The sticker 30 can then be easily removed when desired, re-positioned, and re-adhered to the windshield 12 if desired. In addition, although the polyester film 20 utilizes an adhesive, the low-tack adhesive 25 will not leave a residue on the windshield 12. The low-tack adhesive 25 provides enough hold for the sticker assembly 36 to remain against the windshield 12 for an extended period of time while allowing the assembly 36 to be easily peeled of the windshield 12 when desired.

Furthermore, the polyester film 20 is considered a more rigid film but is still flexible like other films. The film 20 can bend to complex curves such as a windshield that curves from side-to-side as well as from top to bottom. The polyester film 20, however, also has sufficient rigidity and stiffness. Along with the use of the low-tack adhesive 25, this will resist premature peeling or curl-back of the sticker assembly, for example, when subjected to intense weather conditions such as extreme heat or humidity. Using the low-tack adhesive 25 with the polyester film 20 provides good adhesion and resists any premature peeling. The film 20 and adhesive 25 further provides good application stability wherein the sticker assembly 36 can be easily removed when desired without leaving an adhesive residue on the windshield 12. The low-tack adhesive 25 provides sufficient adhesion without the adhesive "locking-up" wherein it can become permanently affixed to the receiving surface and/or leave a residue on the receiving surface.

It is understood that the film 20 can include wide range of different types of films. The film 20 can include any film that has flexibility to accommodate simple or compound curves such as in a car window, and also have sufficient stiffness and rigidity to resist premature peeling or curling from a receiving surface. The film 20 can include, for example, polyester films, polypropylene films, polyethylene films, polystyrene films and the like. The films can be used with or without a top-coat. It is further understood that the film 20 can be used with other types of stickers for mounting on different types of receiving surfaces. The low-tack adhesive used can also include a wide range of different types of adhesives. The low-tack adhesive includes adhesives that provide a sufficient bond to a receiving surface such as a car window over an extended period of time, while still providing a releasable bond wherein a sticker assembly can be peeled from the receiving surface without damage to the sticker assembly or receiving surface. The low-tack adhesive also does not "lock-up" wherein it becomes permanently affixed to the receiving surface and/or leave a residue on the receiving surface.

As discussed herein, in one exemplary embodiment, the film intermediary is a polyester film. The polyester film is selected having a certain weight, thickness, stiffness and stability. The film also has certain adhesive properties including adhesive tack (strength and quickness of adhesion) and general adhesion regarding bond strength to a substrate. Through considerable testing, the inventor has determined that a polyester film having properties as discussed herein provides enhanced operational features.

In addition, the polyester film may be subjected to certain treatments to enhance its performance as a film intermediary. The polyester film can be treated with a top coating or an adhesive primer. The top coating may assist in support of an adhesive layer. The top coating can be applied at a factory location of a film manufacturer or it can be applied aftermarket. The top coating can be applied to the first side of the film 20 to be adhered to the window sticker. The top coat can assist in adhesion between the window sticker and the film 20. These top coats may include adhesive promoters and print promoters that may also be applied to the polyester film. The polyester film may also have corona surface treatments or any other type of electric and non-electric surface disruption treatment. These surface treatments also help promote adhesive and print to be sufficiently supported on a surface of the film. Notwithstanding, the polyester film may be used without a top coat as the inventor has found that a polyester film has properties making it suitable for bonding sufficiently to window stickers.

Through considerable testing in heat, sunlight, and humidity simulation chamber tests and field tests, it has been determined that the polyester film 20 disclosed herein which may have certain treatments, provides a film intermediary having enhanced performance over previous film intermediaries. The polyester film has a higher stiffness than other films and provides a suitable mounting structure for the vehicle sticker allowing the film intermediary and sticker to remain adhered to a vehicle window for an extended time. The polyester film has also been found to be more stable than other films when exposed to environmental elements for an extended time, for example, when the film intermediary and vehicle sticker are subjected to weather conditions such as high heat, humidity and/or UV rays from sunlight. The polyester film will not, for example, become unstable and/or heat up unduly under extreme weather conditions. This prevents the sticker and/or the sticker assembly from shrinking, wrinkling, shriveling or otherwise being affected by the elements. Therefore, preventing such adverse conditions for the sticker and/or sticker assembly, it prevents the sticker and/or sticker assembly from peeling or curling from, or completely falling from the window. The film will remain undetectable to the casual observer until the owner desires to peel the sticker assembly from the window. The inventor notes that only through the considerable testing was it possible to conclude that the polyester film 20 of the present invention provided the enhanced features as a film intermediary. Vinyl films are typically more suitable because of their flexibility as well as lower material costs. While the polyester film may be more expensive than other vinyl film, the polyester film 20 still provided a suitably rigid, but flexible film that was optically clear. Furthermore, through the field tests and simulated chamber tests, the inventor found that the polyester film 20 provided enhanced benefits. For example, the simulated chamber tests included simulating the conditions for a sticker assembly being subjected to 100-200 degrees Fahrenheit conditions for a one year period. Through the tests, the inventor determined that a vinyl film became unstable and started to break down at approximately 120 degrees Fahrenheit. Under such conditions, the sticker assembly and/or vinyl film was more apt to peel or curl away from the window. Conversely, the polyester film was able to withstand temperature much greater than 120 degrees Fahrenheit, including up to approximately 180 degrees Fahrenheit. Thus, a sticker assembly using a polyester film subjected to such conditions, did not experience peeling, curling or falling from the window with respect to the polyester film and/or the sticker assembly.

Furthermore, the polyester film 20 is considered not to have any adverse shelf life issues given the current industry standards. The polyester film 20 of this invention will also not cause any potential health affects to insure that it does not "gas off" any hazardous carcinogens. For transportation and storage stability, the polyester film has no stability issues given the current industry standards of transportation. Lastly, the polyester film of this invention has no unusual fire or explosive hazards.

The film thickness is another consideration. A thicker film lends to additional stability while also preventing any potential curling off the sticker assembly. However, the film must remain thin enough to bend to the curve nature of windshields and also be commercially viable. The thickness of the film 20 may be in the general range from a maximum thickness of approximately 10 mils to a minimum thickness of approximately 1 mil. In one exemplary embodiment, the film thickness can be between approximately 2 mils to approximately 8 mils. In a further exemplary embodiment, the thickness of the film 20 is approximately 4 mils. Through considerable testing by the inventor in actual weather conditions as well as simulation chamber tests, the inventor has found that a polyester film 20 having a thickness of approximately 4 mils provides the above discussed enhanced features over prior film intermediaries. The polyester film 20 of approximately 4 mils provided the most enhanced parameters, including sufficient rigidity, stiffness, stability while also being easy to work with and having sufficient flexibility to conform to suitably conform to a variety of windshield surfaces. In sum, the polyester 20 did not peel or curl from the windshield nor allow the sticker assembly to peel or curl from the windshield. The polyester film 20 of approximately 4 mils is also more economical than other films requiring a greater thickness to withstand the environmental conditions discussed herein as more material costs are incurred. Further in an exemplary embodiment, the 4 mil polyester film 20 was used as an intermediary without a top coat. The polyester film 20 at approximately 4 mil thickness was only arrived at after the considerable testing done by the inventor.

Just as the overall film thickness may be important to the stability of the film 20, the thickness of the protective layers 26, 28 also has an effect on stability. There can be concerns for the stability of the protective covers 26, 28 over time and when the protective covers 26, 28 is exposed to increased heat, humidity, and sunlight. The stability of the protective covers 26, 28 affects its ability to release from the film at the time the user applies the sticker assembly 36. The thickness of the protective covers 26, 28 may be dimensioned to add to the rigidity of the assembly such as for handling such as for trimming or prior to mounting. Directions for the user may also be printed on the covers 26,28 and thus, the thickness is dimensioned to allow for such printing without allowing any printing ink from seeping through the covers 26,28 and damaging the film 20. In one exemplary embodiment, the inventor has determined that an approximate 94# paper layer performs well as a protective layer 26,28. Other paper layers of other weights may also be used.

Other considerations are given to the low-tack adhesive layer 25. Those considerations include: the adhesive bond, the adhesive removability, the adhesive "wet out", and the adhesive stability. The adhesive bond is the ability to hold tight in different temperature, humidity, and sunlight environments. The adhesive removability is the ability to easily and cleanly remove the polyester sticker assembly 36 without leaving any adhesive residue. The adhesive "wet out" is the ability of the adhesive to become transparent when it is applied and smoothed out against the glass. The adhesive stability is the ability of the adhesive to remain bonded during extreme changes in the environment including hot and cold, humidity, and sunlight.

The film intermediary of the present invention can also take additional forms. While polyester films have been disclosed above, it has been found that other types of films can also be used as an intermediary that provide enhanced benefits, such as static-cling films. A polyester film 20 having cling properties, for example, may be employed. Many advantages are realized by employing a static-cling film 20 of the present invention. A primary advantage is the ability to easily peel-off the static-cling sticker assembly, and thus the windshield sticker 30, from the windshield 12. Also, by using the static-cling film as an intermediary, certain windshield stickers 30, such as parking lot stickers, can be easily transferred from one vehicle to another. Finally, by using the static-cling film 20, one can readily adjust the position of the window sticker so that it is perfectly straight in the lowermost corner of the windshield 12. The strong adhesive used with conventional window stickers only allows for one chance in mounting the sticker to the windshield 12. Adjusting the conventional window sticker once adhered to the window is almost impossible.

It is further understood that other types of films can be utilized as an intermediary. For example, a vinyl film can be used as well as all other PET (polyethylene terephthalate) materials. Styrene (vinyl benzene) films can also be used. Polycarbonate films can be utilized as well as all other polycarbonate resin thermoplastic materials. Furthermore, all density levels of polyethylene film can be used. Any of these films can also be subjected to the various treatments discussed above to provide a film having particular desired characteristics.

While the specific embodiments have been illustrated and described, numerous modifications come to mind without significantly departing from the spirit of the invention, and the scope of protection is only limited by the scope of the accompanying Claims.

What is claimed is:

1. A sticker assembly comprising:
a sticker having an indicia-bearing surface;
a non-perforated layer of polyester film having a first side and a second side, the second side having a low-tack adhesive layer; and
an adhesive disposed between the sticker and the first side of the film resulting in direct contact of the adhesive with the polyester film and fixedly attaching the sticker to the polyester film and wherein the second side of the polyester film is adapted to be releasably adhered to a receiving surface and wherein the indicia-bearing surface is adapted to be viewable through the receiving surface wherein the polyester film is positioned between the sticker and the receiving surface and wherein peripheral edges of the polyester film are essentially in registry with peripheral edges of the sticker, wherein the thickness of the polyester film is between approximately 2 mils and approximately 8 mils.

2. The sticker assembly of claim 1 wherein the polyester film has a thickness of approximately 4 mils.

3. The sticker assembly of claim 1 wherein the polyester film is optically clear.

4. The sticker assembly of claim 1 wherein a protective layer is positioned over the low-tack adhesive wherein the protective layer is then removed from the film prior to releasably adhering the first side to the receiving surface.

5. The sticker assembly of claim 4 wherein the protective layer and polyester film are trimmed such that peripheral edges of the protective layer and polyester film are essentially in registry with the peripheral edges of the sticker.

6. The sticker assembly of claim 1 wherein the low-tack adhesive layer is provides sufficient bonding but does not leave an adhesive residue on the receiving surface.

7. The sticker assembly of claim 1 wherein the polyester film is trimmed such that the peripheral edges of the polyester film are essentially in registry with peripheral edges of the sticker.

8. A sticker assembly comprising:
a sticker having an indicia-bearing surface;
a non-perforated layer of polyester film having a first side and a second side, the second side having a low-tack adhesive layer, wherein the thickness of the polyester film is approximately 4 mils; and
an adhesive disposed between the sticker and the first side of the film resulting in direct contact of the adhesive with the polyester film and fixedly attaching the sticker to the polyester film and wherein the second side of the polyester film is adapted to be releasably adhered to a receiving surface and wherein the indicia-bearing surface is adapted to be viewable through the receiving surface, wherein the polyester film is positioned between the sticker and the receiving surface and wherein peripheral edges of the polyester film are essentially in registry with peripheral edges of the sticker.

9. The sticker assembly of claim 8 wherein the polyester film includes an adhesive primer on the film to assist in adhesion between the polyester film and the sticker.

10. The sticker assembly of claim 8 wherein the polyester film is optically clear.

11. The sticker assembly of claim 8 wherein a protective layer is positioned over the low-tack adhesive.

12. The sticker assembly of claim 11 wherein the protective layer is trimmed such that the peripheral edges of the protective layer are essentially in registry with the peripheral edges of the sticker.

13. The sticker assembly of claim 8 wherein the polyester film is trimmed such that the peripheral edges of the polyester film are essentially in registry with the peripheral edges of the sticker.

14. A vehicle sticker assembly mountable to a vehicle windshield, the sticker assembly comprising:
- a sticker having an indicia-bearing surface and an adhesive positioned over the indicia-bearing surface; and,
- a non-perforated layer of polyester film having a first side and a second side, the second side having a low-tack adhesive layer, wherein the thickness of the polyester film is between approximately 2 mils and approximately 8 mils,
- wherein the first side of the polyester film is placed against the adhesive resulting in direct contact of the adhesive with the polyester film and fixedly attaching the sticker to the polyester film and wherein the second side of the polyester film is adapted to be releasably adhered to the vehicle windshield and wherein the indicia-bearing surface is adapted to be viewable through the vehicle windshield wherein the polyester film is positioned between the sticker and the vehicle windshield and wherein peripheral edges of the polyester film are essentially in registry with peripheral edges of the sticker.

* * * * *